United States Patent [19]
Cupps et al.

[11] Patent Number: 5,991,739
[45] Date of Patent: Nov. 23, 1999

[54] INTERNET ONLINE ORDER METHOD AND APPARATUS

[75] Inventors: Bryan Cupps, Bothell, Wash.; Tim Glass, Aptos, Calif.

[73] Assignee: FOOD.COM, San Francisco, Calif.

[21] Appl. No.: 08/976,793

[22] Filed: Nov. 24, 1997

[51] Int. Cl.⁶ .................................................. G06F 17/60
[52] U.S. Cl. ............................... 705/26; 705/26; 705/37; 705/27
[58] Field of Search ............................. 705/26; 340/994; 379/201

[56] References Cited

U.S. PATENT DOCUMENTS

| | | | |
|---|---|---|---|
| 4,530,067 | 7/1985 | Dorr | 364/900 |
| 4,569,421 | 2/1986 | Sandstedt | 186/39 |
| 4,797,818 | 1/1989 | Cotter | 364/401 |
| 4,882,475 | 11/1989 | Miller et al. | 235/383 |
| 4,971,406 | 11/1990 | Hanson | 340/711 |
| 5,444,444 | 8/1995 | Ross | 340/994 |
| 5,533,107 | 7/1996 | Irwin et al. | 379/201 |
| 5,559,707 | 9/1996 | DeLorme et al. | 364/443 |
| 5,648,770 | 7/1997 | Ross | 340/994 |
| 5,655,008 | 8/1997 | Futch et al. | 379/91.01 |

*Primary Examiner*—Kevin J. Teska
*Assistant Examiner*—Mark J. Fink
*Attorney, Agent, or Firm*—Flehr Hohbach Test Albritton & Herbert; Steven F. Caserza

[57] ABSTRACT

A system and method for providing an online ordering machine that manages the distribution of home delivered products over a distributed computer system is herein disclosed. The distributed computer system includes a group of customers connected to client computers and at least one server computer system that executes the online ordering machine. The online ordering machine provides the customers with product information from various vendors whose delivery range is within the customer's location or with product information from vendors having take out service within a specified range from the customer's location. The vendor's and customer's location is associated with a geocode representing the latitude and longitude coordinates of the location. The search for the vendors servicing the customer's location is done using the geocodes. The online ordering machine accepts orders from the customer for a particular product from a selected vendor. The order is converted into voice instructions which are transmitted to the vendor through a telephone call. The vendor receives the telephonic order and responds to voice-prompted instructions used to confirm the order.

40 Claims, 20 Drawing Sheets

Header:
    Order Number
    Order Type
    First Time Customer
    Delivery
    Special Instructions
    RDS Number
    Restaurant Name
    Restaurant Phone
    Restaurant Fax
    Customer Name
    Customer Email
    Customer Address1
    Customer Address2
    Customer Cross St.
    Customer City
    Customer Phone
    Total
    Payment Type
    Special Count
    Item Count Special:
    ID
    Description of Item
    Price
    Item Count Special Item:
    ID
    Description of Item
    Price
    Item Count Item:
    ID
    Description of Item
    Quantity
    Price Return Information:
    Return Code
    Delivery Time

FIG. 6

Pizza

Delivery Restaurants

The following restaurants were found in your area. To see a restaurant's menu, click the Logo, Restaurant Name, or Menu Button.

| 1-5 | 6-10 | 11-11 |
|---|---|---|
| Ba-Ga | Go-Pi | Ro-Ro |

Home
Repeat Customer
Cuisines
○ Restaurants

User Profile
Opportunitie$
Help
About Us
Nominate Restaurants

Click here to see  Special Saving$

 Ballard Firehouse 
5429 Russell Ave NW Seattle, WA
Relax we'll bring it to you

Cucina! Cucina!
901 Fairview N Seattle, WA
Where you will receive the finest food in town. Additional 3% charge on Visa, Master Card and American Express.

 Elliott Bay Pizza Company 
2115 Queen Anne Ave. N. Seattle, WA
Queen Anne's newest pizzeria owned and operated by Wayne & Kelly Glass. The Gourmet Pizza is known for its distinctive marinara sauce.

 Enzo's 
605 Queen Anne Ave N Seattle, WA
Relax we'll bring it to you

[Menu & Ordering]

 Gardelli's Pizza & Pasta 
2422 1st Ave. Seattle, WA
Taste the difference! Everything is home-made: Dough, pizza sauce, italian sausage, dressings and clam sauce. We use low-fat cheese and no oil in any of our sauces.

| 1-5 | 6-10 | 11-11 |
|---|---|---|
| Ba-Ga | Go-Pi | Ro-Ro |

FIG. 8

Enzo's Delivery - Menu
605 Queen Anne Ave N Seattle, WA

Home
Repeat Customer
Cuisines
Restaurants
○ Menu

User Profile
Opportunities
Help
About Us
Nominate Restaurants

Categories

Pizza
Specialty Pizza
Antipasti
Salad
Pesce Fresco
For The Love Of Pasta
Enzos Favorite Pastas
Carne E Pollo
Enzos Classic Pastas
Enzos Classic Pasta Side
Orders
Desserts
Beverages

Order Summary

Nothing Yet

Click Here!
To Proceed

Pizza Every Enzos Pizza Begins With Fresh, Hand Tossed Dough, Then Covered Generously With Our Rich Pizza Sauce And Real Mozzarella.

| | | |
|---|---|---|
| Cheese Pizza | | Small 10" – 7.35, Medium 12" – 8.35, Large 14" – 9.35, Extra Large 16" – 10.35 |
| One Item Pizza | | Small 10" – 8.85, Medium 12" – 9.85, Large 14" – 11.10, Extra Large 16" – 12.10 |
| Two Item Pizza | | Small 10" – 10.35, Medium 12" – 11.35, Large 14" – 12.85, Extra Large 16" – 13.85 |
| Three Item Pizza | | Small 10" – 11.85, Medium 12" – 12.85, Large 14" – 14.60, Extra Large 16" – 15.60 |
| Four Item Pizza | | Small 10" – 13.35, Medium 12" – 14.35, Large 14" – 16.35, Extra Large 16" – 17.35 |
| Five Item Pizza | | Small 10" – 14.85, Medium 12" – 15.85, Large 14" – 18.10, Extra Large 16" – 19.10 |

FIG. 9 cybermeals™
The World's Largest Take-Out and Delivery Service!
Order from your local restaurants.

Demo cybermeals
Visit cybermeals

Click Here!

Repeat Customer
Enter login name and password below.
LOGIN NAME

PASSWORD    Click Here!

New Customer
Register now to begin ordering.

Click Here!

Switch to Text Version
© 1997 cybermeals

FIG. 12A

Cuisines

Home
Demo
○ Cuisines

Opportunitie$
Help
About Us
Nominate Restaurants

Thank you for visiting cybermeals! As if you were at:
The Seattle Space Needle - 219 Fourth Avenue North, Seattle, WA 98109

This is a DEMO - Register Now!

Click Here to see All 56 Restaurants. A restaurant may be listed in more than one cuisine.

    

| Cravings (31) | Asian (17) | European (13) | American (16) | Exotic (1) |
|---|---|---|---|---|
| ☪·Pizza (11) | Chinese (8) | Italian (11) | Mexican (4) | Caribbean |
| Deli (3) | Thai (3) | French | Fast Food (1) | South American |
| Sandwiches (18) | Japanese (4) | Mediterranean | Health | Persian |
| Coffee Shop (3) | Indian (2) | Greek | American (7) | North African |
| Hamburgers (9) | Korean (2) | Bistro (2) | Bar-B-Que (4) | Lebanese (1) |
| Salads (19) | | German | Soul Food (2) | |
| Breakfast (5) | | English | Southwestern | |
| Seafood (10) | | | Tex-Mex (1) | |
| Wraps | | | | |
| Chicken (8) | | | | |

FIG. 12C

INTERNET ONLINE ORDER METHOD AND APPARATUS

The present invention relates to systems and methods for electronic commerce and particularly to an Internet self-ordering mechanism.

BACKGROUND OF THE INVENTION

The Internet has provided consumers with a new medium for electronic commerce. Currently, there exist several Internet services that provide consumers with access to menus for food products that can be ordered online.

World Wide Waiters is one such service in which each consumer and participating restaurants are linked via the Internet to the World Wide Waiter server. The World Wide Waiter server provides a web site that includes web pages having menus of several participating restaurants with home delivery and/or take-out service. The consumer can search for a menu either using a restaurant's name or a city.

The consumer can then place an order from the menu of a selected restaurant which is transferred to the World Wide Waiter server. The World Wide Waiter server then emails the order over the Internet to the restaurant. The restaurant confirms the order to the World Wide Waiter server. Upon receiving the restaurant's confirmation, the World Wide Waiter server transmits to the consumer a confirming email that the restaurant has received the order and will deliver the order.

In addition, World Wide Waiters allows a customer to fax the order directly to the World Wide Waiters office. Personnel at the World Wide Waiters office contacts the restaurant in order to process the order.

There are several shortcomings to this system. First, each participating restaurant needs to have Internet access to the World Wide Waiter server. This additional expense can deter restaurant proprietors from utilizing this type of home delivery service.

Second, the World Wide Waiter server downloads to the customer statically created HTML pages representing the menus of each participating restaurant. These menu web pages are preconfigured and stored in the server. The use of these statically configured menu web pages becomes a burden since it hampers the maintainability and scalability of the server to take on additional restaurants.

Waiters on Wheels is another Internet online ordering service that provides Internet consumers with a web site to advertise menus of participating restaurants and that accepts consumer orders. It faxes an order to a participating restaurant. It provides its own waiters which pick up the take-out order from a participating restaurant and deliver it to the consumer's location.

The menus are stored by the geographic location of a Waiters on Wheels office. A consumer searches those menus associated with the Waiters on Wheels office within their delivery location. A consumer can order online from the menu. The Waiters on Wheels server confirms receipt of the consumer's order by telephone. If the restaurant cannot deliver the order to the Internet consumer, the restaurant telephones the Waiters on Wheels office. The office in turn calls the consumer to inform them of the problem.

PizzaNet is another prior art online ordering system that provides Internet consumers with a web site including menus of participating pizza restaurants. To place an order, consumers enter their zip code, telephone area code, and the first three digits of their phone number. A list of participating pizza restaurants within the consumer's location is provided along with their menus. The consumer can then select the restaurant of his or her choice and order from its menu. PizzaNet receives the order from the Internet and faxes to the restaurant a copy of the order. In some instances, PizzaNet verifies the order by a return phone call and in other cases the pizza restaurant verifies the order by return phone call.

A shortcoming of the Waiter on Wheels and PizzaNet systems is in its method of communicating with the restaurant through a facsimile machine. The additional expense incurred in installing a facsimile machine can deter prospective restaurants from participating in this system. Further, once an order is received, all subsequent communications between the customer and the delivery system are performed via telephone calls which requires manual intervention.

SUMMARY OF THE INVENTION

The present invention pertains to an online ordering machine that manages the distribution of home delivered products over a distributed computer system. The distributed computer system includes a group of customers connected to client computers and at least one server computer system that executes the online ordering machine. The online ordering machine provides the customers with product information from various vendors whose delivery range is within the customer's location or with product information from vendors having take out service within a specified range from the customer's location. The online ordering machine accepts orders from the customer for a particular product from a selected vendor. The order is converted into voice instructions which are transmitted to the vendor through a telephone call. Alternatively, the order can be transmitted via facsimile transmission with follow up voice instructions transmitted via a telephone call seeking a response. The vendor responds to the voice-prompted instructions which are then used to confirm the order.

In an embodiment of the present invention, the online ordering machine enables Internet customers to order food products from various participating restaurants. The online ordering machine is a Web server including a web creation procedure that dynamically generates menu web pages in response to a customer's request. The menu web pages list the various products for delivery or takeout service. An Internet customer is provided with a menu web page listing those vendors or restaurants that service the customer's location. In addition, the online ordering machine indicates which restaurants are open at the time the customer makes the request.

The online ordering machine categorizes the location of each participating restaurant by a set of longitude and latitude coordinates. Each customer's delivery location is also categorized by a set of longitude and latitude coordinates. The online ordering machine searches for those restaurants whose delivery area lies within the customer's location based on the restaurant's and customer's longitude and latitude coordinates. Likewise, the online ordering machine searches for those restaurants having takeout service within the customer's location based on the restaurant's and customer's longitude and latitude coordinates.

Once an Internet customer places an order, the order is converted into voice data. An interactive voice recognition (IVR) procedure receives the order as an order text file and converts the order into a voice file of recorded speech segments. The IVR procedure automatically places a call to the restaurant and transmits the voice file which is played when the call is received. In addition, the IVR procedure can transmit the order as a facsimile transmission and follow up with an automated telephone call. In either case, voice prompts are used to obtain a response from the restaurant in the form of one or more DTMF tones. The online ordering machine then relays a status response to the customer.

BRIEF DESCRIPTION OF THE DRAWINGS

Additional objects and features of the invention will be more readily apparent from the following detailed description and appended claims when taken in conjunction with the drawings, in which:

FIG. 6 is an exemplary format of the order text file in a preferred embodiment of the present invention.

FIGS. 8–10 are schematic representations of exemplary menu web pages that are dynamically created in response to a customer's response.

FIGS. 12A–12C are schematic representations of exemplary menu web pages used to receive an order in a preferred embodiment of the present invention.

DESCRIPTION OF THE PREFERRED EMBODIMENTS

Computer Architecture

Figure 1:
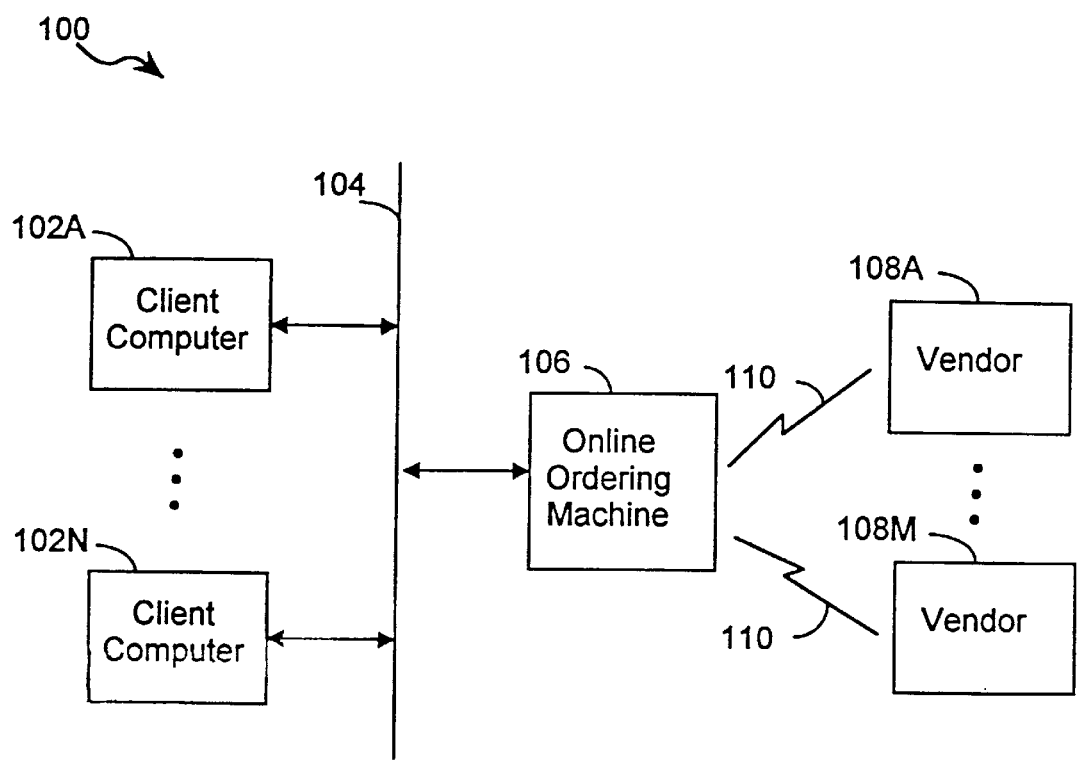
FIG. 1 is a block diagram of an embodiment of a distributed computer system incorporating the present invention.

FIG. 1 illustrates a system 100 representing an embodiment of the present invention including a number of client computers 102A–102N and one or more online ordering machines 106 in communication via a communications link 104. In a preferred embodiment, an online ordering machine 106 is a server computer. An online ordering machine 106 is in communication with one or more vendors 108A–108M through one or more telephone links 110.

The communication link 104 generically refers to any type of wire or wireless link between computers, such as but not limited to a local area network, a wide area network, or a combination of networks. In a preferred embodiment of the present invention, the communications link 104 can be a network such as the Internet.

A client computer 102 can be any type of computing device, such as but not limited to, desktop computers, workstations, laptops, and/or mainframe computers. One or more users (not shown) can be associated with each client computer 102.

Figure 2:
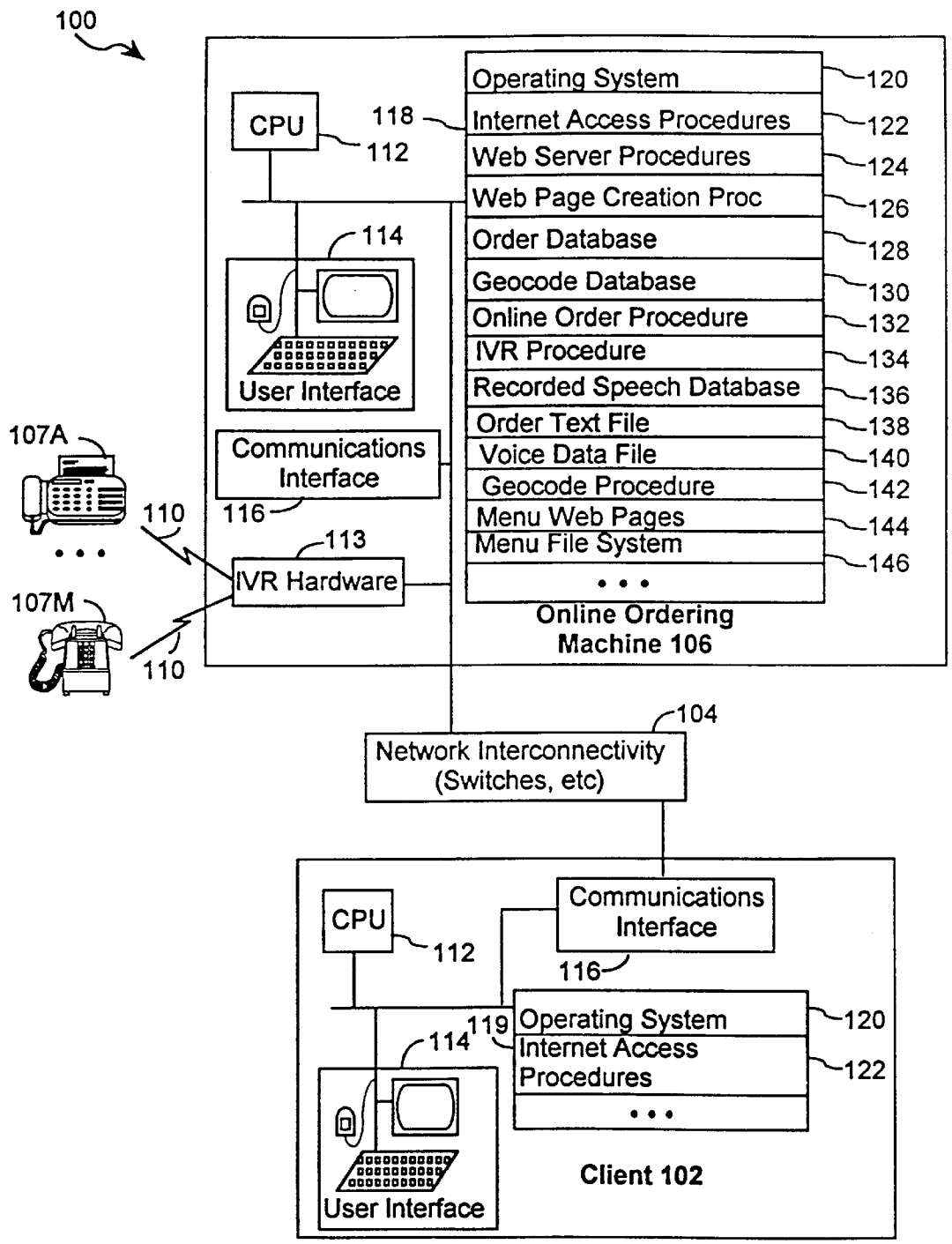
FIG. 2 is a block diagram of the client computer and online ordering machine as shown in FIG. 1.
Figure 3A:
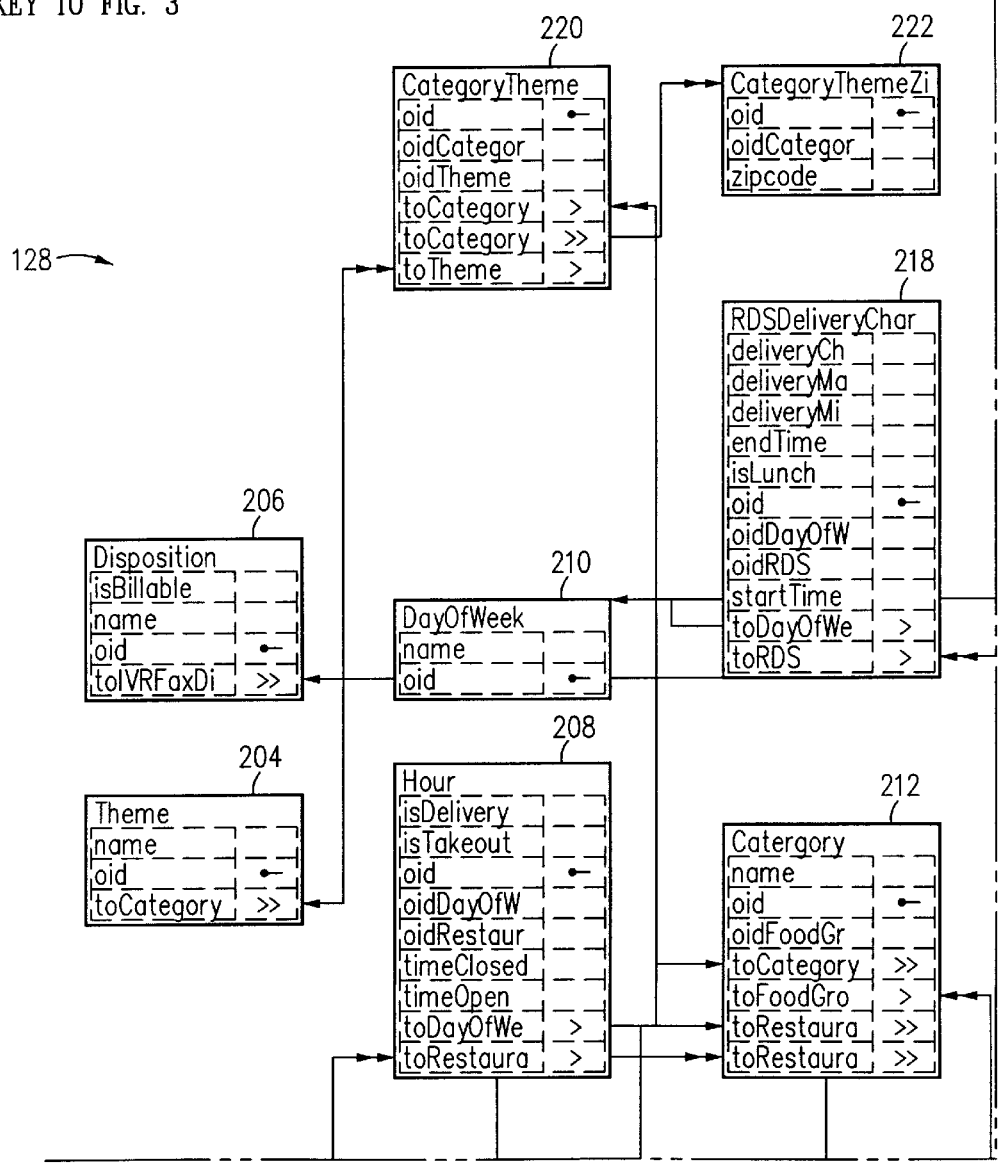
FIG. 3 illustrates the order database schema in a preferred embodiment of the present invention.
Figure 3B:
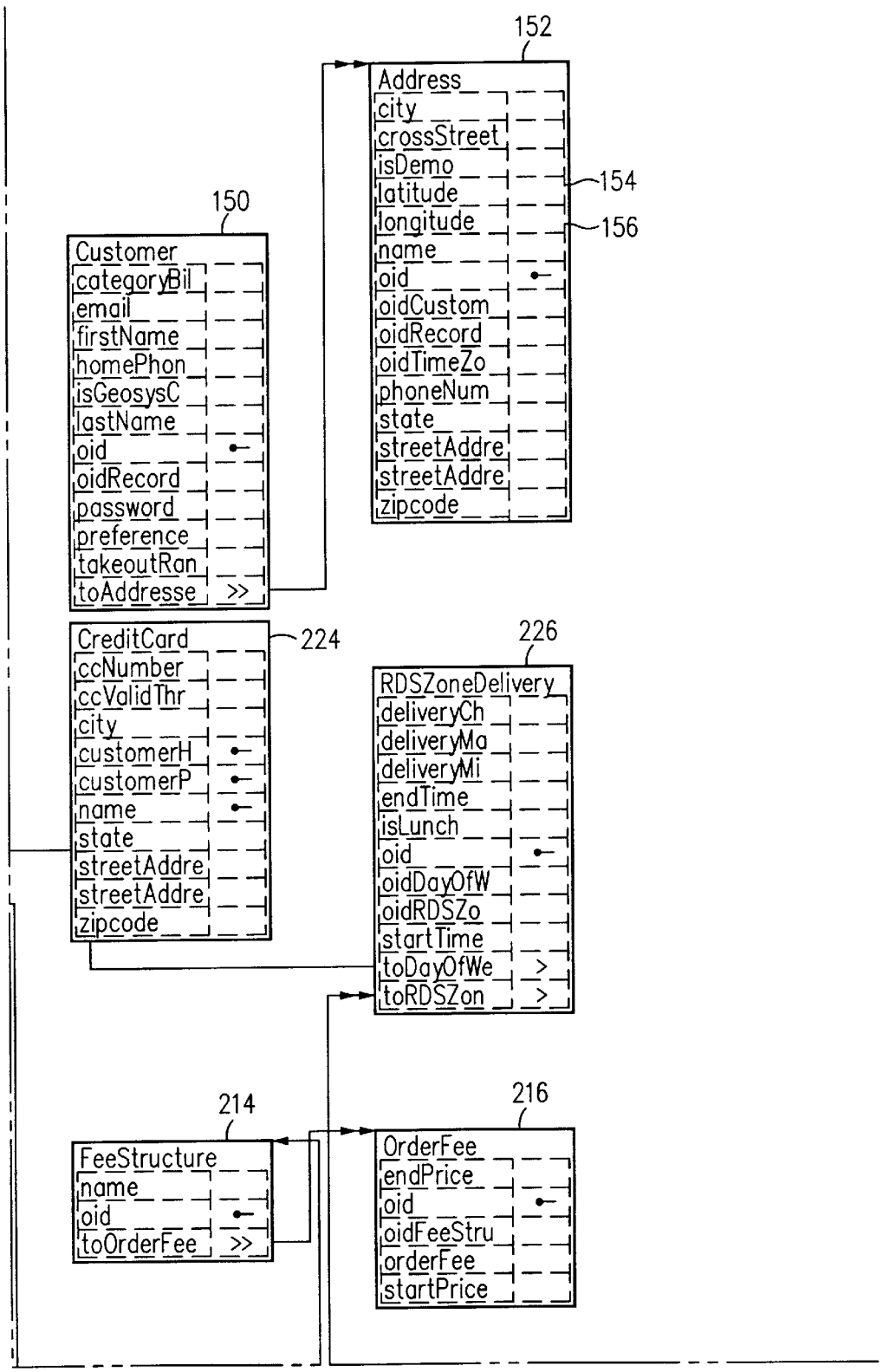
Figure 3C:
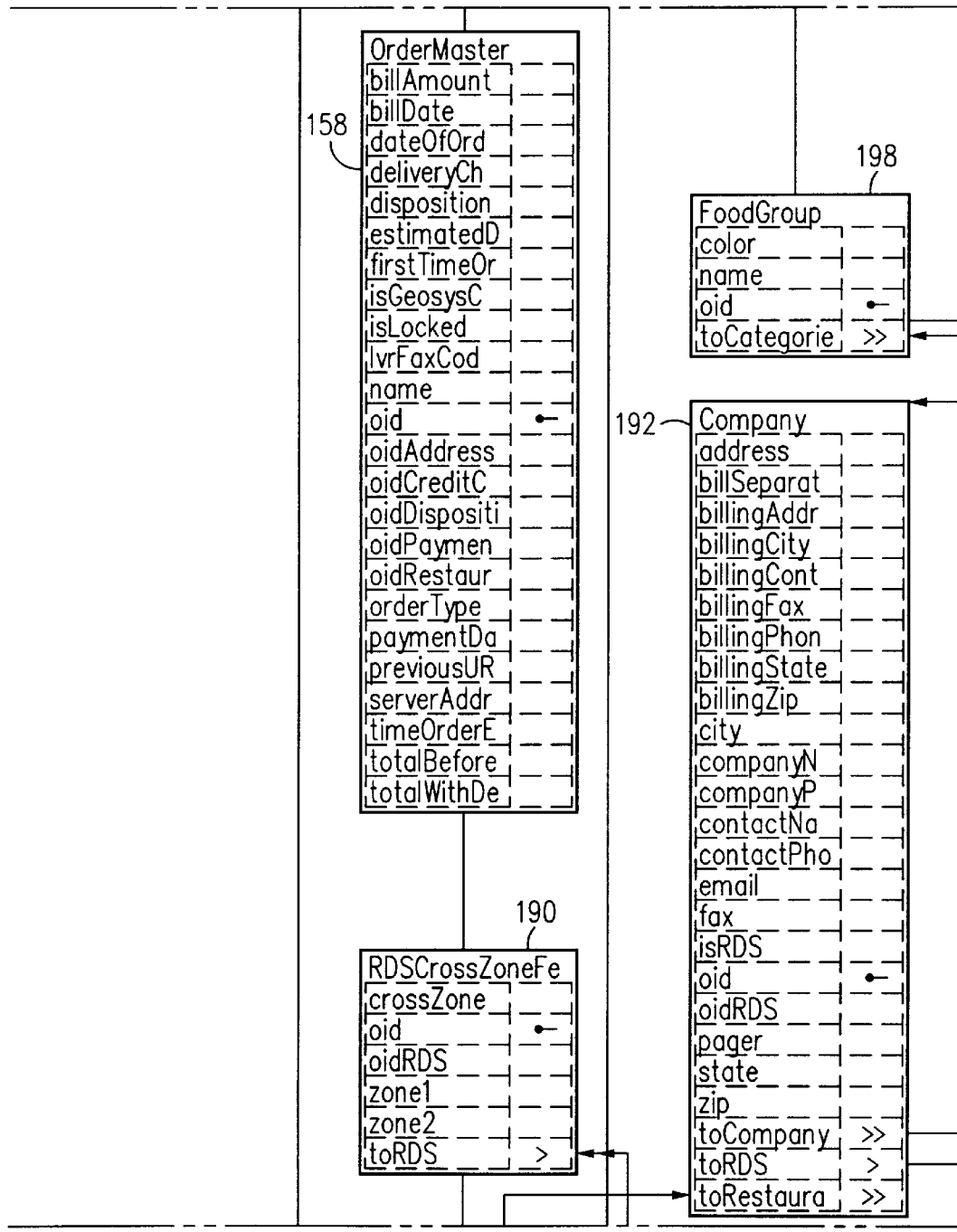
Figure 3D:
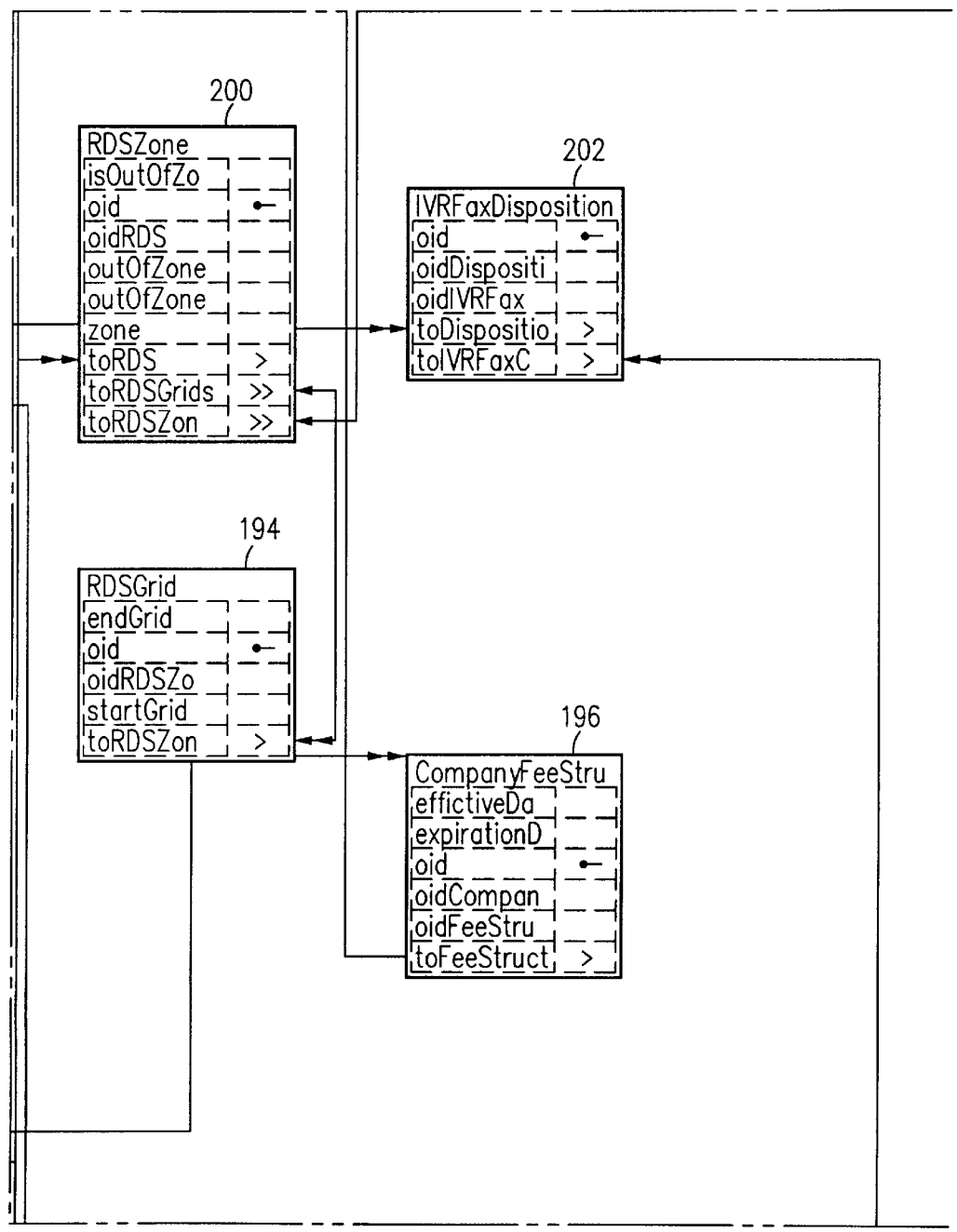
Figure 3E:
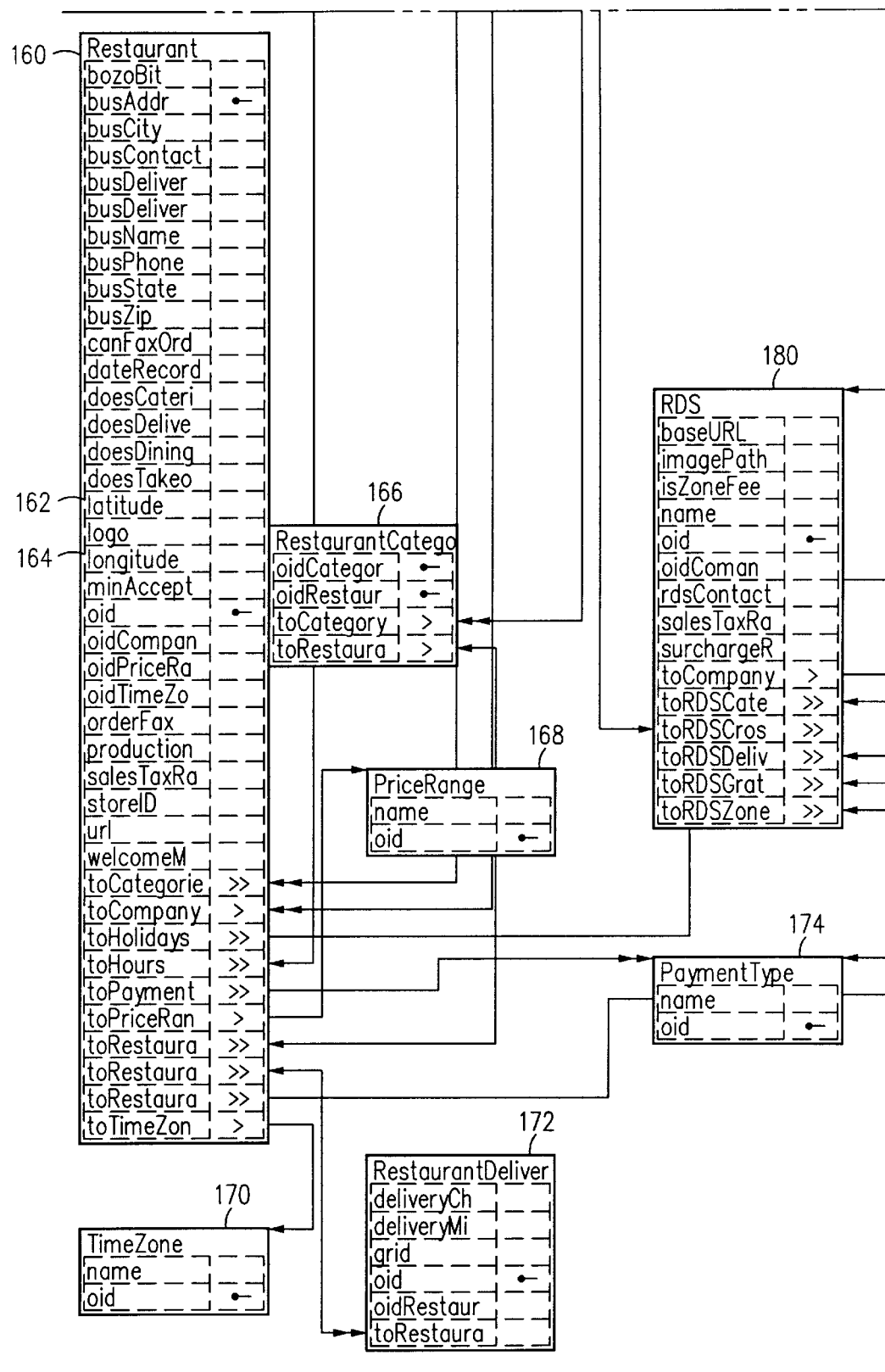
Figure 3F:
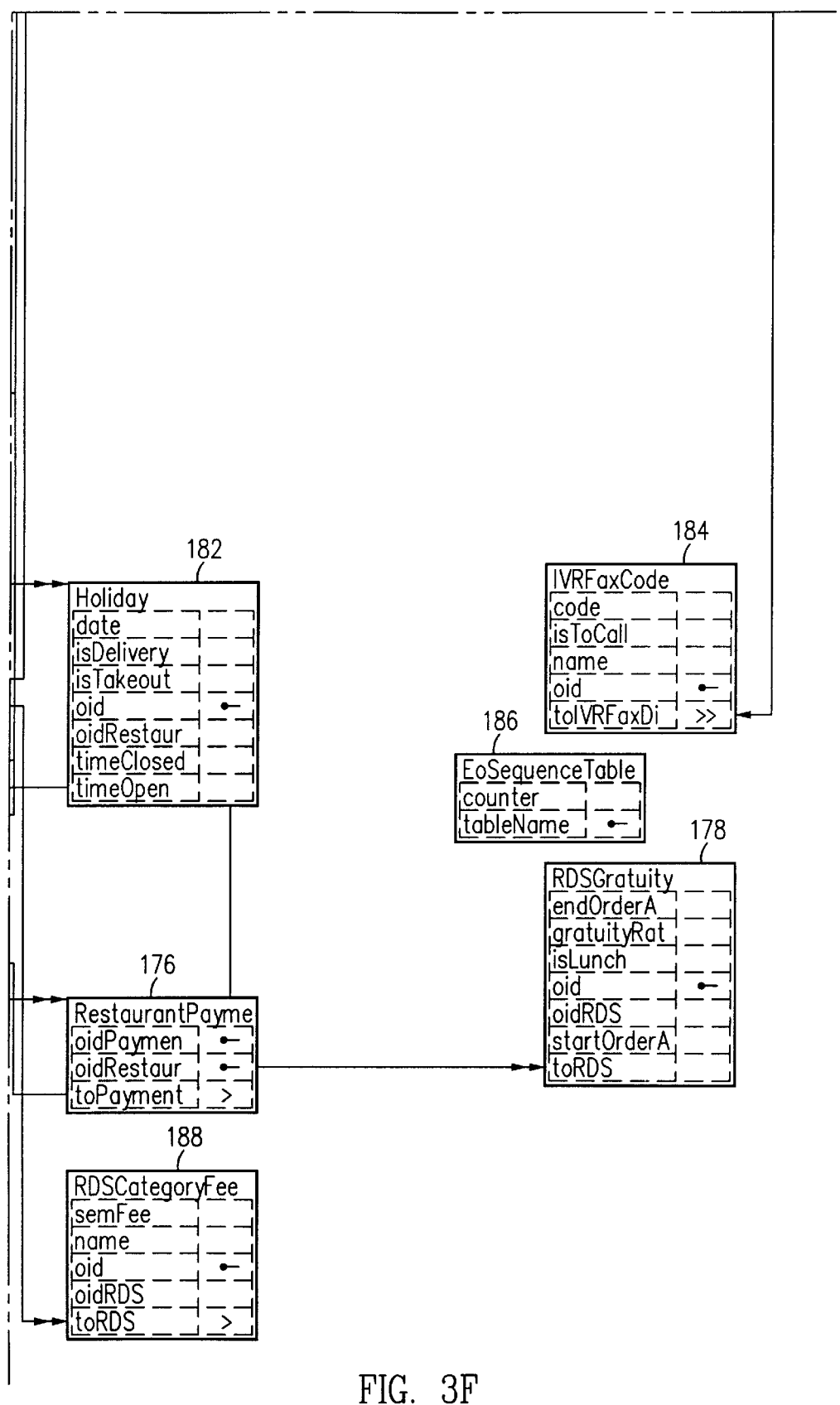

FIG. 2 illustrates the client computer 102 which includes a CPU 112, a user interface 114, a memory 119, and a communication interface 116. The communications interface 116 is used to communicate with the server computer 106 as well as other system resources not shown. The memory 119 of the client computer 102 may be implemented as RAM (random access memory) or a combination of RAM and non-volatile memory such as magnetic disk storage. The memory 119 can contain the following:

an operating system 120;
Internet access procedures 122;
as well as other procedures and files.

FIG. 2 also illustrates the online ordering machine 106 which includes a central processing unit (CPU) 112, Interactive Voice Recognition (IVR) hardware 113, a user interface 114, a memory 118, a communications interface 116. The online ordering machine 106 can be any type of computing device, such as but not limited to, desktop computers, workstations, laptops, and/or mainframe computers. The communications interface 116 is used to communicate with the client computers 102 as well as other system resources not shown.

The IVR hardware 113 connects the online ordering machine 106 to a telephonic link 110 coupled to one or more telephonic devices, such as but not limited to a facsimile machine 107A and/or a telephone 107M. Each telephonic device 107 can be associated with a particular vendor 108. The IVR hardware 113 provides interactive voice recognition capabilities including voice processing, speech recognition, and text-to-speech processing.

In a preferred embodiment of the present invention, the IVR hardware 113 consists of three types of devices: (1) one or more Dialogic™ CP/12SC™ facsimile boards that provide the online ordering machine 106 with 60 or more facsimile channels, the facsimile board enables communication between the online ordering machine 106 and a facsimile machine 107 associated with a vendor 108; (2) one or more Dialogic™ D/240SC-T1™ boards that provide 24 digital signal processor (DSP)-based ports to an on-board T-1 telephone interface; and (3) one or more Dialogic™ D/41 ESC™ boards that provide four DSP-based voice ports to an on-board analog telephone interface. The facsimile board enables communication between the online ordering machine 106 and a facsimile machine 107A associated with a vendor 108. The D/240SC-T1™ board enables interactive voice recognition capabilities between the online ordering machine 106 and a vendor 108 having an analog telephonic interface, and the D/41 ESC™ board enables interactive speech recognition capabilities between the online ordering machine 106 and a vendor 108 or customer having an analog telephone interface. A more detailed description of these devices can be found in the product literature for each of these products located at http://ww.dialogic.com which is hereby incorporated by reference as background information.

It should be noted that the present invention is not constrained to the preferred IVR hardware and that other such hardware devices can be used that provide a similar capability.

The memory 118 of the online ordering machine 106 may be implemented as RAM (random access memory) or a combination of RAM and non-volatile memory such as magnetic disk storage. The memory 118 can contain the following:

an operating system 120;
Internet access procedures 122;
web server procedures 124;

web page creation procedures 126 that dynamically generate menu web pages in response to a customer's request;

an order database 128 that includes information on each of the customers, vendors, and received orders;

a geocode database 130 that is used to convert a geographic location such as a street address into longitude and latitude coordinates;

an online ordering procedure 132;

an interactive voice recognition (IVR) procedure 134 that is used to deliver a voice message and obtain a response to the voice message;

a recorded speech database 136 including one or more recorded speech segments;

an order text file 138 that is an ASCII representation of the order in a preferred format;

a voice data file 140;

a geocode procedure 142 that is used to convert a geographic location into its corresponding longitude and latitude coordinates;

one or more menu web pages 144 that are dynamically created by the web creation procedure 126;

a menu file system 146 including one or more menu files representing menu data associated with a particular vendor, preferably, the menu files are binary files stored in a NS encoded format; and other procedures and data structures.

FIG. 3 illustrates the schema of the order database 128. The order database 128 can include the following tables:

a customer table 150 having an entry for each customer that tenders an order to the online ordering machine 106, the customer entry including information that characterizes a particular customer;

an address table 152 having an entry for each customer and including the latitude 154 and longitude 156 coordinates associated with a customer's address;

an order master table 158 having an entry for each order;

a restaurant table 160 having an entry for each restaurant containing information that describes the restaurant, its services and products, each entry including the latitude 162 and longitude 164 coordinates associated with a restaurant;

a restaurant category table 162 associated with the restaurant table 160 that is used to identify a category associated with a restaurant;

a price range table 168 associated with the restaurant table 160 identifying the price ranges for products offered by a restaurant;

a time zone table 170 associated with the restaurant table 160 indicating the time zone corresponding to a restaurant;

a restaurant delivery table 172;

a payment type table 174;

a restaurant payment table 176;

a restaurant delivery service (RDS) gratuity table 178;

a RDS table 180;

a holiday table 182 associated with the restaurant table and indicating the restaurant's holidays;

an IVR fax code table 184;

an EoSequence table 186;

a RDS Category Fee table 188;

a RDS Cross Zone Fee table 190;

a company table 192;

a RDS grid table 194;

a company fee structure table 196;

a food group table 198;

a RDS zone table 200;

an IVR fax disposition table 202;

a theme table 204;

a disposition table 206;

an hour table 208;

a day of week table 210;

a category table 212;

a fee structure table 214;

an order fee table 216;

a RDS delivery table 218;

a first category theme table 220 and a second category theme table 222;

a credit card table 224; and a RDS zone delivery table 226.

It should be noted that the present invention is not limited to the database schema shown in FIG. 3. Other schemas can be utilized and other types of databases, other than the relational database shown in FIG. 3 can be utilized as well.

Geocodes

The present invention uses geocodes to determine whether a customer is within a specified geographic area of a restaurant's delivery area or whether a restaurant is within a specified geographic area of the customer's takeout range. The use of geocodes has the advantage of producing more accurate search results. The prior art use of zip codes, cities, or telephone prefixes generally produces unsatisfactory results listing restaurants that do not deliver to the customer's location. In addition, the geocodes can be used to specify a geographic location anywhere within the globe, thereby enabling the online ordering machine to accommodate international locations as well as the United States.

A geocode represents a particular geographic area or grid defined by longitude and latitude coordinates. Longitude and latitude coordinates are used to define a geographic location relative to the surface of the earth. The earth's reference system is composed of surface divisions denoted by geographic lines of latitude and longitude. A specific geographic location can be defined in this system by its respective longitude and latitude coordinates.

Figure 4:
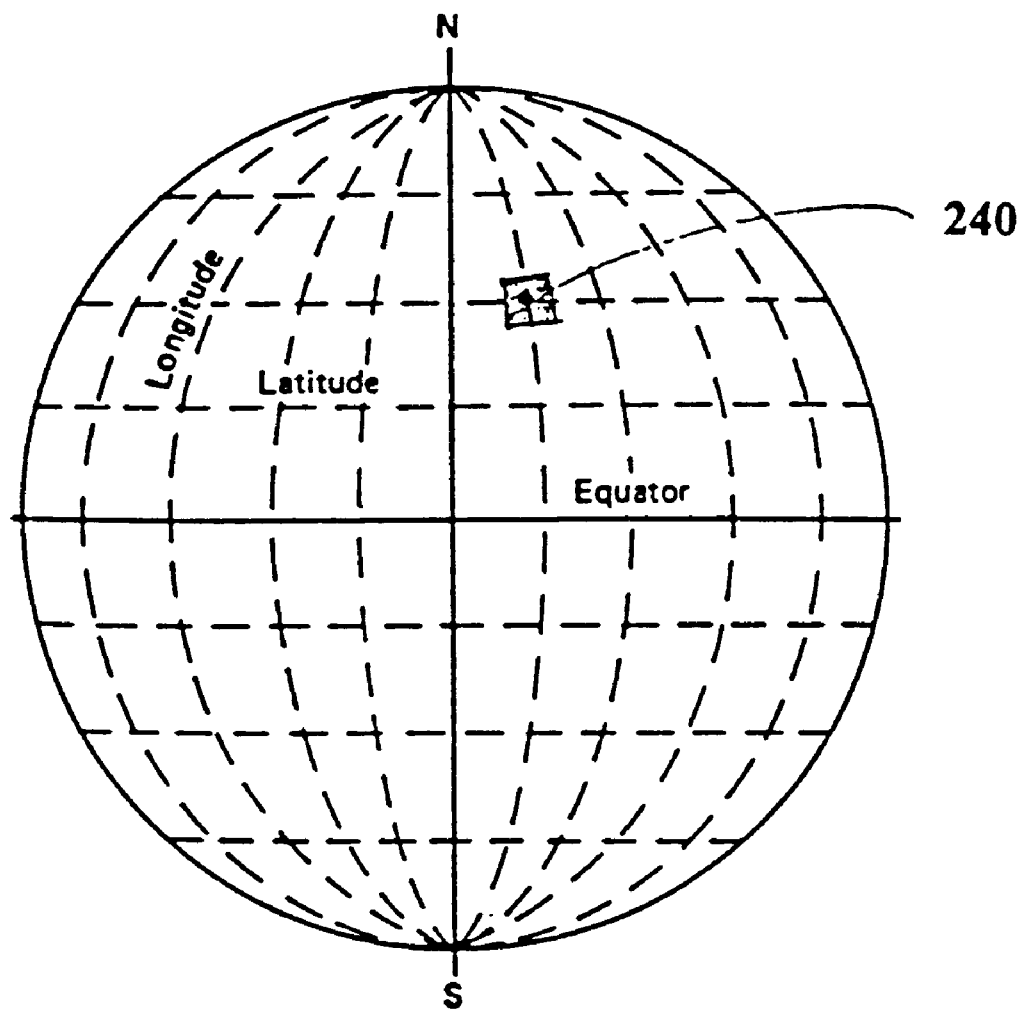
FIG. 4 illustrates the geocodes in a preferred embodiment of the present invention.

FIG. 4 illustrates the earth with latitude and longitude lines. The area 240 is represented by a geocode associated with a latitude and a longitude coordinate. Typically, a latitude coordinate is specified in latitude degrees and a longitude coordinate is specified in latitude degrees.

The technology of the present invention uses the geocodes to identify each customer and vendor in order to determine whether a customer is within a specified geographic area or grid of a restaurant's delivery area or whether a restaurant is within a specified geographic area or grid of the customer's takeout range. A geocode procedure 142 is used that converts the address of each customer and vendor into its respective latitude and longitude coordinates. The latitude and longitude coordinates then become the geocode which represents a particular grid. Next, the online order procedure 132 uses the geocode to search the order database 142 to make the appropriate selections.

In a preferred embodiment, the grid size for the United States was selected between 0.25 and 0.3 miles. For example, a 0.3 mile grid equates to 0.0054 longitude degrees and 0.0043 latitude degrees. Thus, in order to convert the latitude and longitude coordinates of a customer or restaurant location into a geocode, the following mathematical equations can be used:

Latitude Id=trunc [(latitude in degrees*$10^6$)/4300]+1,

Longitude Id=abs (trunc[-(longitude in degrees*$10^6$)/5400]+1),

Geocode=Latitude Id, Longitude Id

The geocodes can then be used to determine whether a customer is within a specified geographic area of a restaurant's delivery area or whether a restaurant is within a specified geographic area of the customer's take-out range. To determine whether a customer is within a specified geographic area of a restaurant's delivery area, the customer's geocode is used to search the order database 128 for those restaurants having the same geocode.

The following mathematical relation is used to select restaurants that are within a customer's takeout range:

---
IF the Latitude Id of the restaurant > Latitude Id customer's location
− Takeout Range and
    the Latitude Id of the restaurant < Latitude Id of the customer's location
+ Takeout Range and
    Longitude Id of the restaurant > Longitude Id of the customer's location
− Takeout Range and
    Longitude Id of the restaurant < Longitude Id of the customer's location
+ Takeout Range,
  THEN
    Restaurant is within the Takeout Range.

---

In certain geographic areas, a grid size between 0.25 and 0.3 miles may be too large for a delivery or takeout range. In such cases, the grid can be partitioned into smaller grid sizes. The larger grid is referred to as the parent grid and the smaller grids are referred to as the child grids.

Figure 5:
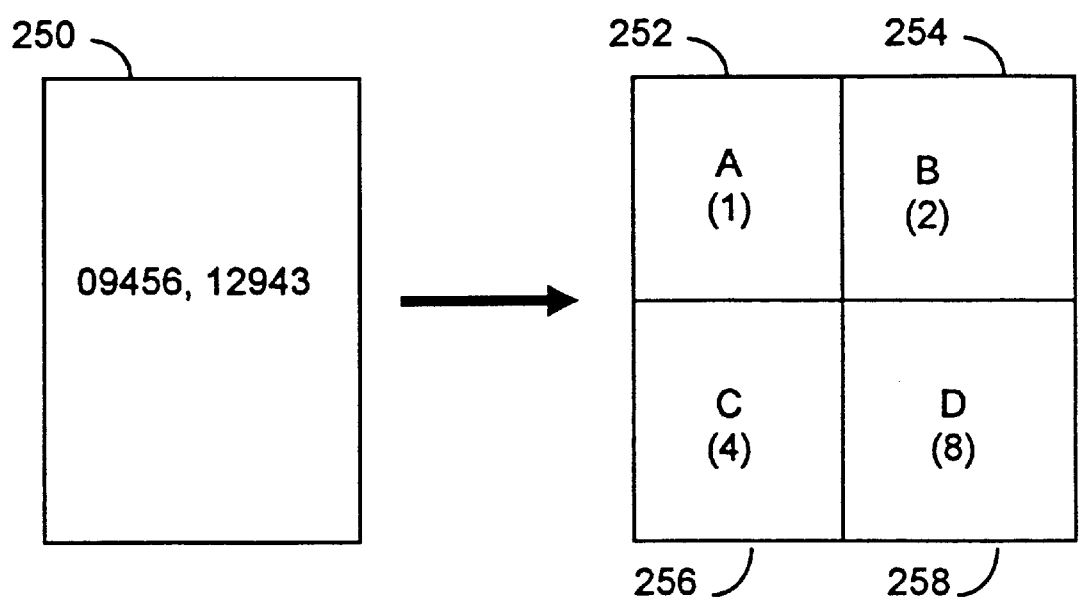
FIG. 5 is a block diagram illustrating the partitioning of a grid area into smaller areas in a preferred embodiment of the present invention.

FIG. 5 illustrates one such example of this partitioning. A parent grid 250 having a grid size between 0.25–0.3 miles is associated with a geocode 09456, 12943. The parent grid 250 is partitioned into four child grids 252–258 having a grid size between 0.06–0.075 miles. Each child grid 252 is associated with a subgrid identifier such as A, B, C, or D that represents an associated geographic region.

A vendor can service one or more of the child grids. For example, vendor X can service child grid A, vendor Y can service child grids A and B, and vendor Z can service child grids A and D. As such, a coding scheme was developed to identify all the possible combinations that can occur. A numeric value is associated with each child grid. For example, child grid A is associated with the value 1, child grid B with the value 2, child grid C with the value 4, and child grid D with the value 8. The sum of these values represent a particular combination of delivery areas. For example, the combination of child grid A and B is identified by a value of 3. Table 1 below shows the encoding scheme for all possible combinations in the child grid scheme shown in FIG. 5.

TABLE 1

| VALUE | COMBINATION |
|---|---|
| 1 | A |
| 2 | B |
| 3 | A,B |
| 4 | C |
| 5 | A,C |
| 6 | B,C |
| 7 | A,B,C |
| 8 | D |
| 9 | A,D |
| 10 | B,D |
| 11 | A,B,D |
| 12 | C,D |
| 13 | A,C,D |
| 14 | B,C,D |
| 15 | A,B,C,D |

When searching for a matching vendor, the geocode procedure 142 determines the appropriate subgrid identifier associated with the customer's location. For example, customer X can be associated with the geocode 09456, 2943A. The online order procedure 132 then searches for those vendors servicing child grid A associated with parent grid 09456, 12943. In the above example, that would encompass searching for all the odd values: 1, 3, 5, 7, 9, 11, 13, and 15.

It should be noted that the technology of the present invention can be practiced with other partitioning or encoding schemes. One skilled in the art can easily modify the present invention to accommodate other subgrid sizes and to even partition the subgrids further. Other encoding schemes can be used to identify the various possible delivery combinations associated with a particular parent grid. In addition, one can combine one or more adjacent grids to formulate a larger delivery or takeout range for a particular geographic area.

Interactive Voice Recognition (IVR) System

The Interactive Voice Recognition (IVR) procedure 134 is used to convert a customer's text order into voice data that is transmitted to the vendor 108. Alternatively, the IVR procedure 134 can convert a customer's order into a format suitable for facsimile transmission.

When a customer's order is received by the online order machine 106, it is converted into an order text file 138 having a prescribed format as shown in FIG. 6. The order text file 138 is then transmitted to the IVR procedure 134. If the order is to be transmitted to the vendor by facsimile transmission, then the IVR procedure 134 formats the order text file 138 into a format that is suitable for facsimile transmission (e.g., postscript format) and transmits the order to the IVR hardware 113. The IVR hardware 113 is used to transmit the order to the vendor 108.

When the order is to be transmitted to the vendor 108 by telephone transmission, the IVR procedure 134 then translates the order text file 138 into a voice data file 140 using the recorded speech database 136. The voice data file 140 is then transmitted to the IVR hardware 113 which transmits the voice data to the vendor 108.

Dynamically Created Menu Web Pages

The online ordering machine 106 generates menu web pages 144 that are specific to a particular customer's request. The creation of the menu web pages 144 is done dynamically at runtime in order to provide data that accommodates a customer's request. The creation of the menu web pages 144 in this manner differs from the prior art online order systems. In the prior art online order systems, the menu web pages are preconfigured and displayed upon request. This becomes a burden to maintain and limits scalability. In the present technology, each menu web page 144 is configured at runtime and customized for a particular customer's request. Thus, each menu web page 144 differs since each customer's request is different as is the customer's location.

Figure 7:
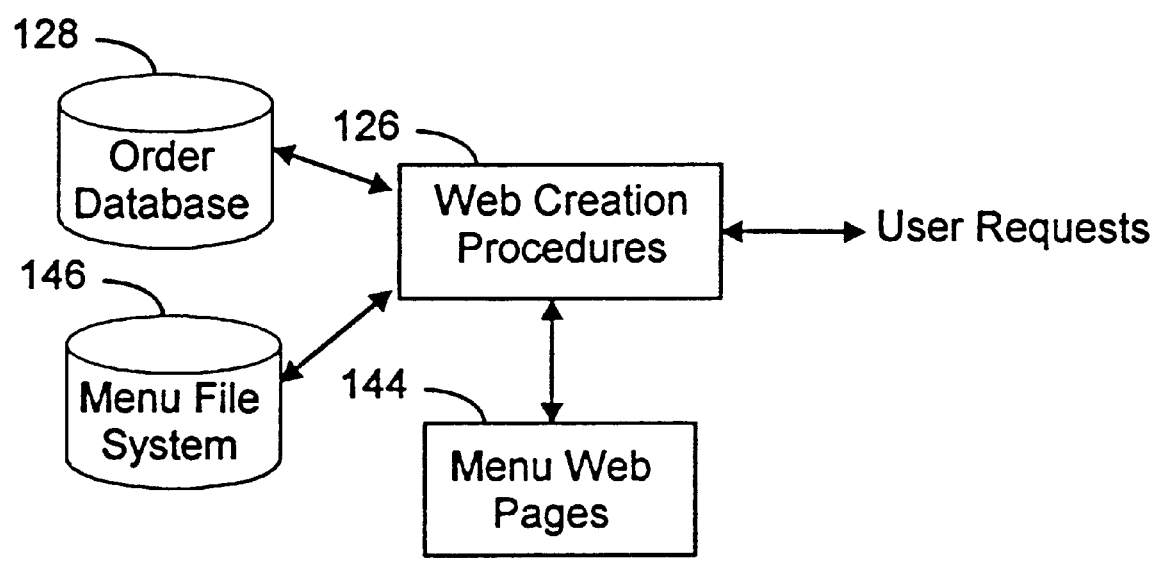
FIG. 7 is a block diagram illustrating the menu web page creation in a preferred embodiment of the present invention.

FIG. 7 illustrates the components used to dynamically generate a menu web page 144. A web page creation procedure 126 is provided that receives as input one or more customer requests and is linked to the order database 128 and the menu file system 146. The web page creation procedure 126 generates a menu web page 144 based on the input received from the user. The data included in the menu web page 144 is retrieved from the order database 128 and the menu file system 146. The order database 128 contains information such as the operational time of a vendor, the restaurant's logo, the categories of the food products served, and the like. The menu file system 146 includes menu data associated with each vendor. The menu file system 146 includes a number of menu files stored in an encoded binary format for faster retrieval purposes. The web page creation procedure 126 uses the data in the order database 128 and the menu file system 146 to dynamically generate one or more menu web pages 144 that are customized to a customer's request.

In a preferred embodiment, the web page creation procedure 126 utilizes the WebObjects technology provided by Apple Software. WebObjects is a server technology that links the order database 128 directly to the web server procedures 124 and generates HTML web menu pages 144 based on a customer's request. More detailed information on WebObjects can be found at http://software.apple.com/webobjects which is hereby incorporated by reference as background information.

Figure 10:

FIGS. 8–10 are exemplary menu web pages 144. FIG. 8 is a menu web page 144 showing the first five pizza restaurants that deliver within a particular customer's location. The restaurants shown are selected based on the customer's location and the restaurant's delivery area. As such, this menu web page 144 is dynamically created for this particular customer.

Likewise, FIG. 9 is a menu web page 144 showing the various types of food items that a particular restaurant offers for delivery service within a particular customer's location. This menu web page 144 was created in response to the customer's request for pizza selections. FIG. 10 is a menu web page 144 showing the various types of "pesce fresco" items that a particular restaurant offers for delivery service within a particular customers location. This menu web page 144 was created in response to the customer's request for "pesce fresco" selections.

Ordering Process

Figure 11:
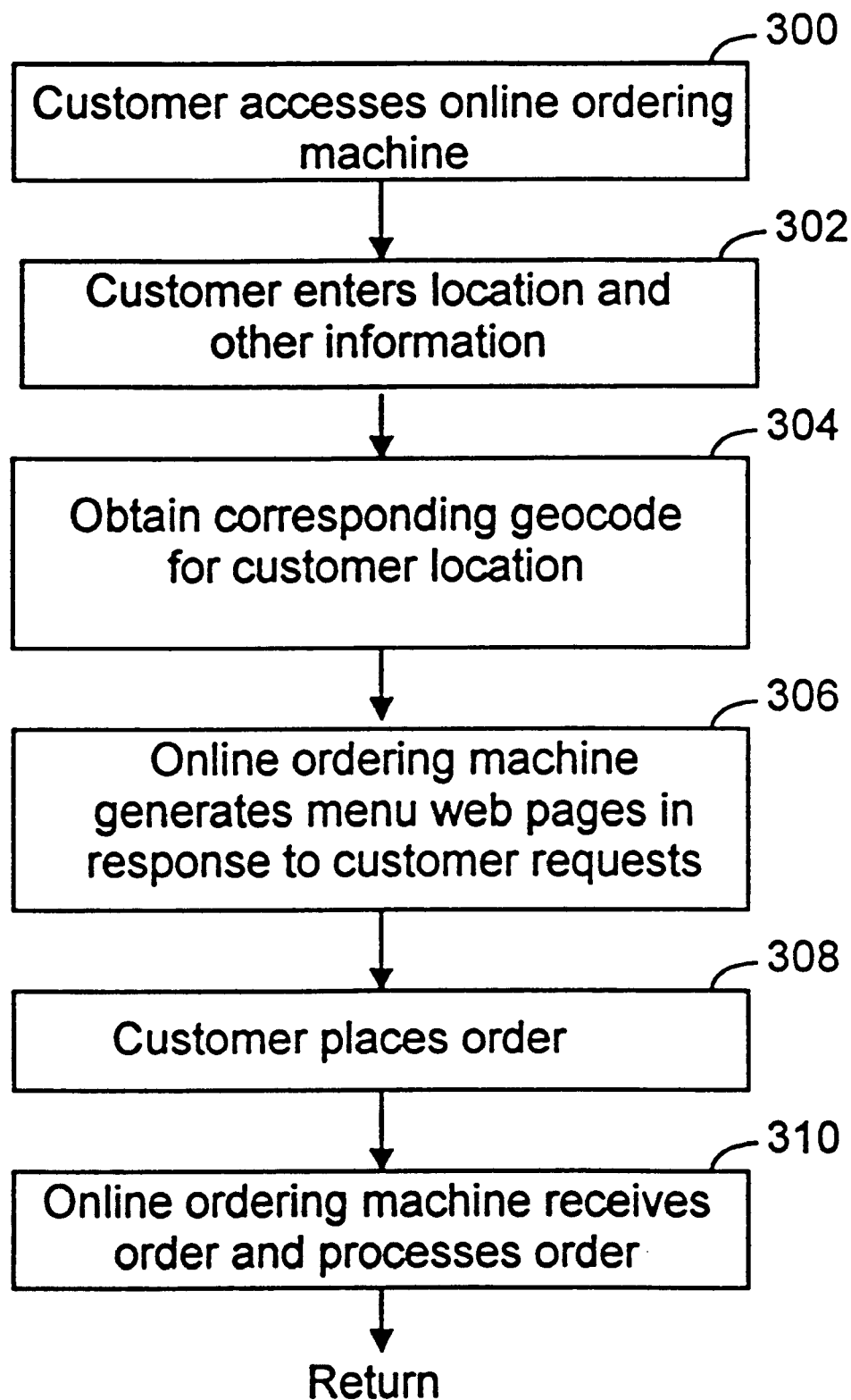
FIG. 11 is a flow chart illustrating the steps used to process an order in a preferred embodiment of the present invention.
Figure 12B:
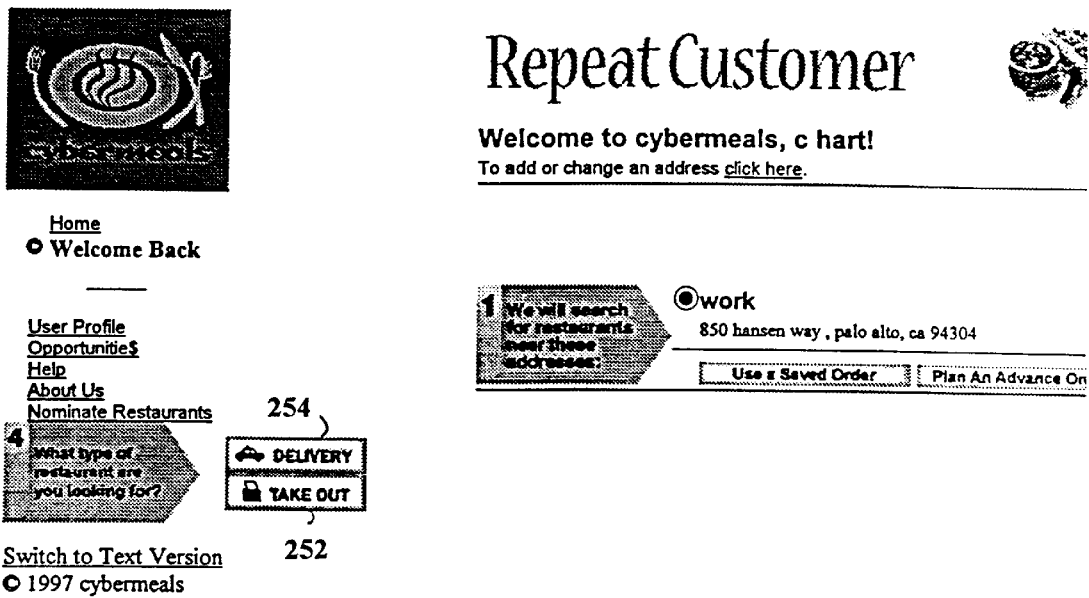

FIG. 11 illustrates the steps used by the online ordering machine 106 to process an online order. A customer accesses the online ordering machine 106 through a client computer 102 that is connected to the Internet 104. The customer enters the appropriate web address or universal resource locator (URL) for the online ordering machine 106 (step 300). The online order procedure 132 interacts with the client computer 102 by providing access to a series of web pages that can be downloaded to the client computer 102 for the customer's use (step 300). Initially, a home web page is provided to the client computer 102 which is shown in FIG. 12A.

The customer can register with the online ordering machine 106 which is accomplished by filling out information requested through one or more web pages. The customer is then provided with a web page that prompts the customer for his location as shown in the exemplary web page illustrated in FIG. 12B (step 302). This web page can also obtain the current time at the customer's location which is returned to the online order procedure 132 (step 302). The current time is used to determine which restaurants meeting the customer's criteria are currently open. In addition, the web page obtains the type of service that the customer seeks, such as but not limited to take-out service 252 or delivery service 254. If takeout service is requested, the web page requests the range of miles that the customer is willing to drive. If none is indicated, a default value is provided.

Once the customer's location is provided, the online order procedure 132 converts the customer's location into the appropriate geocode as described above (step 304).

The online order procedure 132 then searches the order database 128 for those restaurants that deliver to the customer's location or are within the customer's desired takeout range (step 306). This search is performed as described above with respect to the geocode procedure 142. A menu web page 144 including a list of these restaurants is dynamically created by the web creation procedure 126 and provided to the customer as shown in FIG. 12C.

The customer can then select a particular vendor or restaurant and one or more menu web pages 144 including the selected information that is dynamically created by the web creation procedure 126 and provided to the customer's client computer 102. The customer can then browse through the menu web pages 144 and select items of interest. The user's selection or requests are used by the web creation procedure 126 to generate one or more menu web pages 144 that are displayed to the customer (step 306). FIGS. 8–10 illustrate such exemplary menu web pages 144.

The customer places an order by selecting the appropriate items from the menu web pages 144 (step 308) which are then transmitted to the online ordering machine 106 (step 310). The online ordering machine 106 receives the order and processes it as shown in FIG. 13 (step 310).

Figure 13:
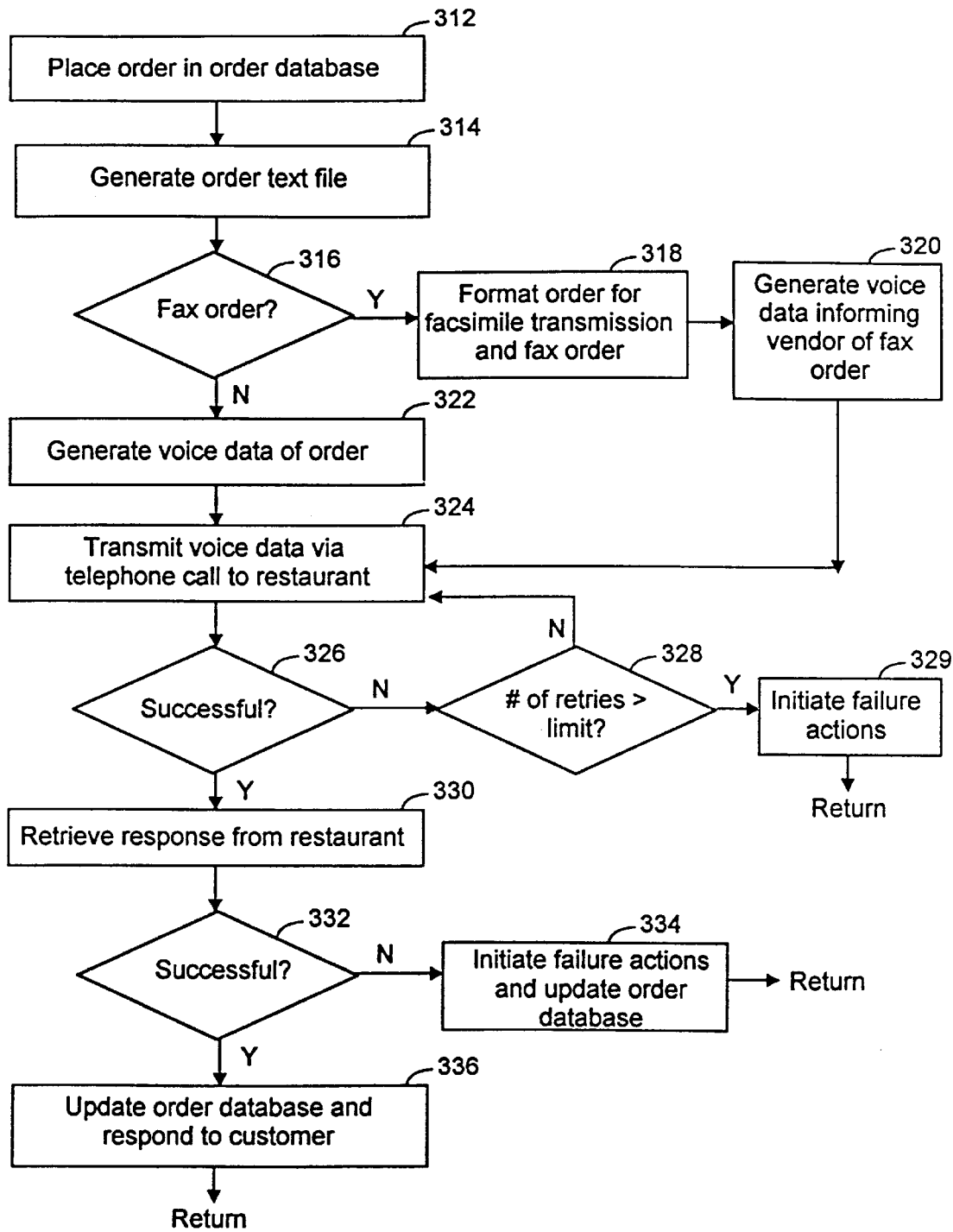
FIG. 13 is a flow chart illustrating the steps used to process an order in a preferred embodiment of the present invention.

Referring to FIG. 13, an entry is generated for the order in the order database 128 (step 312). An order text file 138 is generated representing the order in accordance with a prescribed format as shown in FIG. 6 (step 314).

In the case where the order is transmitted by facsimile transmission to the vendor (step 316-Y), the order text file 138 is then formatted for facsimile transmission and transmitted to the vendor as described above (step 318). A voice data file 140 is then generated that informs the vendor 108 of the transmitted fax order (step 320).

In the case where the order is transmitted by a telephone call, the IVR procedure 134 is used to convert the order text file 138 into voice data (step 322). The IVR procedure 134 performs the conversion by finding prerecorded speech segments stored in the recorded speech database 136 that match the words contained in the order text file 138. The speech segments are then concatenated into a voice data file 140 that is then transmitted to the IVR hardware 113 (step 324). The IVR hardware 113 then establishes telephonic communication with the vendor 108 and transmits the voice data to the vendor 108 (step 324).

In some instances, one or more calls may be made to the vendor 108 before communication is established (step 326-N). After a predetermined number of unsuccessful attempts have been made that have failed to establish communication to the vendor 108 (step 328-Y), the online ordering procedure 132 may initiate failure actions. These failure actions can include calling the vendor directly to place the order or to determine the nature of the problem (step 329). Based on the nature of the problem, in some cases, the customer can be notified of the failed communication and asked to select another vendor 108 (step 329). In addition, the online order procedure 132 updates the order database 128 to reflect the status of the order (step 329).

In the case where the online ordering procedure 132 is successful in communicating with the vendor 108 (step 326-Y), the vendor 108 hears a recorded message including voice prompts for responses from the vendor 108. An exemplary transcript of such a recorded message can be as follows:

This is cybermeals with (an/a repeat) order for (delivery/carry out). Press 1 when you are ready to take this order.

When the employee presses 1, the voice continues with the following: The customer's phone number is . The customer's name is . The address is (only if the order is for delivery). The order is . Total prices excluding tax and coupons is .

The employee is then given the option of pressing further keys: 5 to accept the order, 6 to decline the order, 2 to pause the order, 3 to repeat the order, 4 to hear only the address repeated, 7 to repeat the food items, total price, and payment method, 8 to repeat the phone number, and * to just repeat the last segment you were listening to.

Finally, the voice requests that the vendor press keys to indicate how long the order will take to deliver.

If the IVR procedure 134 encounters any failures in retrieving the vendor's response (step 332-N), the online order procedure 132 initiates one or more failure recovery actions to rectify the failure. For example, if the vendor 108 does not respond to a telephonic order, a manual telephone call can be made to the vendor 108 in order to ascertain the nature of the problem or to obtain the response.

If the IVR procedure 134 receives a response from the vendor 108 (step 332-Y), the online order procedure 132 transmits a notification to the customer indicating the status of an order and updates the order database 128 with the status thereby completing the order (step 336). Notification to the customer can be by an email message, or other communication medium, and can include an expected delivery time.

In addition to the aforementioned steps, the online order procedure 132 can also transmit to the vendor 108 directions to the customer's location either as a facsimile transmission, as a telephone call, email message, and the like. Likewise, the online order procedure 132 can transmit through any medium directions to a vendor's location to a customer requesting takeout service.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to ordering food products from restaurants, it is not limited to this particular product or vendor. The present invention can be used for other electronic commerce purposes, other commodities, other types of vendors, and other types of services other than delivery or takeout.

In addition, the present invention is not constrained to transmitting a customer's order to the vendor through the interactive voice recognition system as described above. A modem connection can be established which will enable communication between the online ordering machine and the vendor through the Internet thereby allowing email communication, web communication, and the like.

What is claimed is:

1. A method for exchanging data in a distributed computer system comprising a plurality of client computers and at least one server computer connected by a communications link to the client computers, the server computer capable of connecting by one or more communications links to a plurality of vendors, said method comprising the steps of:

storing vendor data associated with the vendors;

associating with each vendor at least one geocode representing a geographic location associated with a particular vendor;

receiving a request for vendor data from one of the client computers, the request including a geographic location associated with the requesting client computer;

converting the requesting client computer's associated geographic location into a corresponding geocode;

selecting vendor data that is associated with zero or more vendors having a geocode that is compatible with the requesting client computer's geocode; and providing the selected vendor data to the requesting client computer.

2. The method of claim 1, wherein said providing step further comprises the step of:
dynamically creating one or more menu web pages including the selected vendor data in response to the request; and
transmitting the menu web pages to the requesting client computer.

3. The method of claim 1, wherein each geocode includes a latitude coordinate and a longitude coordinate.

4. The method of claim 1, wherein the vendor geocode represents a delivery range;
said selecting step further comprises the step of:
finding one or more vendors whose geocode matches the requesting client computer's geocode.

5. The method of claim 4, said selecting step further comprises the steps of:
associating an operational time with each vendor;
obtaining a current time from the requesting client computer; and
indicating which of the found vendors are operational when the request is made.

6. The method of claim 1, said selecting step further comprises the steps of:
obtaining a takeout range from the requesting client computer; and
selecting those vendors whose geocode is within the takeout range of the requesting client computer's geocode.

7. The method of claim 1 further comprising the steps of:

obtaining an order from the requesting client computer for a vendor product from a select vendor;

representing the order as voice data; and transmitting the voice data to the select vendor through a telephonic link.

8. The method of claim 7, further comprising the steps of:

receiving a reply from the select vendor; and transmitting a response to the requesting client computer.

9. The method of claim 1 further comprising the steps of:

obtaining an order from the requesting client computer for a vendor product from a select vendor; and transmitting the order to the select vendor as a facsimile transmission.

10. The method of claim 9 further comprising the steps of:

transmitting to the select vendor a telephonic communication indicating the facsimile transmission;

obtaining a reply from the vendor; and forwarding a response to the requesting client computer indicating the reply.

11. An order entry apparatus for managing the procurement of orders for vendor products on a computer network, said computer network comprising a plurality of client computers in communication with the order entry apparatus by a first communication link, the order entry apparatus capable of being connected by one or more communications links to a plurality of vendors, said apparatus comprising:

a plurality of vendors, each vendor associated with a vendor geocode representing a location associated with the vendor;

a plurality of users, each user associated with a particular client computer, each user associated with a user geocode representing a geographic location associated with the user;

a plurality of vendor data; and an online ordering procedure having a capability to receive a request for vendor data from a requesting user and to select vendor data associated with vendors having a geocode compatible with the geocode of the requesting user.

12. The apparatus of claim 11, wherein each geocode includes a latitude and a longitude coordinate.

13. The apparatus of claim 11, comprising:

a web page creation procedure having a capability to dynamically generate one or more menu web pages including the select vendor data in response to the request received from the requesting user.

14. The apparatus of claim 11, wherein the online order procedure further includes the capability to select vendor data associated with one or more vendors having a vendor geocode that matches the requesting user geocode.

15. The apparatus of claim 11, wherein the online order procedure further includes the capability to select vendor data within a takeout range of the requesting user geocode.

16. The apparatus of claim 11, comprising:

a geocode procedure having the capability to map a geographic location into a geocode.

17. The apparatus of claim 11:

wherein the online order procedure includes the capability to receive an order for one or more vendor products; and further comprising an interactive voice recognition (IVR) procedure having the capability to convert the order into voice data and to transmit the voice data through a communication link to a particular vendor.

18. The apparatus of claim 17:

wherein the IVR procedure includes the capability to receive a reply from the vendor through a communication link; and wherein the online order procedure includes the capability to transmit a response to the requesting user indicating the reply.

19. The apparatus of claim 17:

wherein the IVR procedure includes the capability to transmit the order through a communication link to a particular vendor.

20. The apparatus of claim 19:

wherein the IVR procedure includes the capability to receive a reply from the vendor through a communication link; and wherein the online order procedure includes the capability to transmit a response to the requesting user indicating the reply.

21. A computer readable storage medium that directs a computer to function in a specified manner, comprising:

a plurality of vendors, each vendor associated with a vendor geocode representing a location associated with the vendor;

a plurality of users, each user associated with a particular client computer, each user associated with a user geocode representing a geographic location associated with the user;

a plurality of vendor data; and an online ordering procedure having a capability to receive a request for vendor data from a requesting user and to select vendor data associated with vendors having a geocode compatible with the geocode of the requesting user.

22. The apparatus of claim 21, wherein each geocode includes a latitude and a longitude coordinate.

23. The apparatus of claim 21, comprising:

a web page creation procedure having a capability to dynamically generate one or more menu web pages including the select vendor data in response to the request received from the requesting user.

24. The apparatus of claim 21, wherein the online order procedure further includes the capability to select vendor data associated with one or more vendors having a vendor geocode that matches the requesting user geocode.

25. The apparatus of claim 21, wherein the online order procedure further includes the capability to select vendor data within a takeout range of the requesting user geocode.

26. The apparatus of claim 21, comprising:

a geocode procedure having the capability to map a geographic location into a geocode.

27. The apparatus of claim 21:

wherein the online order procedure includes the capability to receive an order for one or more vendor products; and further comprising an interactive voice recognition (IVR) procedure having the capability to convert the order into voice data and to transmit the voice data through a communication link to a particular vendor.

28. The apparatus of claim 27:

wherein the IVR procedure includes the capability to receive a reply from the vendor through a communication link; and wherein the online order procedure includes the capability to transmit a response to the response to the requesting user indicating the reply.

29. The apparatus of claim 27:
wherein the IVR procedure includes the capability to transmit the order through a communication link to a particular vendor.

30. The apparatus of claim 29:
wherein the IVR procedure includes the capability to receive a reply from the vendor through a communication link; and
wherein the online order procedure includes the capability to transmit a response to the requesting user indicating the reply.

31. The method of claim 1,
wherein one or more of said communications links to said vendors comprise a computer network link.

32. The method of claim 1,
wherein one or more of said communications links to said vendors comprise the internet.

33. The method of claim 11,
wherein one or more of said communications links to said vendors comprise a computer network link.

34. The method of claim 11,
wherein one or more of said communications links to said vendors comprise the internet.

35. The apparatus of claim 21:
wherein the online order procedure includes the capability to receive an order for one or more vendor products; and
further comprising a procedure to transmit the order information through a communication link to a particular vendor.

36. The apparatus of claim 35:
wherein the procedure includes the capability to receive a reply from the vendor through a communication link; and
wherein the online order procedure includes the capability to transmit a response to the response to the requesting user indicating the reply.

37. The method of claim 35,
wherein said communication link to a particular vendor comprises a computer network link.

38. The method of claim 35,
wherein said communication link to a particular vendor comprises the internet.

39. The method of claim 36,
wherein said communication link to a particular vendor comprises a computer network link.

40. The method of claim 36,
wherein said communication link to a particular vendor comprises the internet.

* * * * *